United States Patent
Wang et al.

(10) Patent No.: US 11,129,126 B2
(45) Date of Patent: *Sep. 21, 2021

(54) COMMUNICATION NODES AND METHODS THEREIN FOR POSITIONING IN A WIRELESS COMMUNICATIONS NETWORK

(71) Applicant: Telefonaktiebolaget LM Ericsson (publ), Stockholm (SE)

(72) Inventors: Meng Wang, Sundbyberg (SE); Fredrik Gunnarsson, Linköping (SE); Henrik Rydén, Solna (SE); Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/902,451

(22) Filed: Jun. 16, 2020

(65) Prior Publication Data

US 2020/0314792 A1 Oct. 1, 2020

Related U.S. Application Data

(63) Continuation of application No. 16/321,256, filed as application No. PCT/SE2016/050736 on Aug. 1, 2016.

(51) Int. Cl.
*H04W 24/00* (2009.01)
*H04W 64/00* (2009.01)
(Continued)

(52) U.S. Cl.
CPC .............. *H04W 64/00* (2013.01); *G01S 5/02* (2013.01); *G01S 5/0215* (2013.01);
(Continued)

(58) Field of Classification Search
CPC ................ H04W 64/22; H04W 4/02
(Continued)

(56) References Cited

U.S. PATENT DOCUMENTS

2014/0187259 A1 7/2014 Kakani et al.
2014/0335885 A1 11/2014 Steiner et al.
(Continued)

FOREIGN PATENT DOCUMENTS

CN 102461289 5/2012
CN 104583803 4/2015
(Continued)

OTHER PUBLICATIONS

PCT International Preliminary Report on Patentability for International application No. PCT/SE2016/050736—dated May 18, 2018.
(Continued)

*Primary Examiner* — Temica M Beamer
(74) *Attorney, Agent, or Firm* — Baker Botts LLP

(57) ABSTRACT

Embodiments herein relate to a method performed by a first communication node (110; 121) for determining the position (of a second communication node (122) in a wireless communications network (100). The first communication node (110; 121) transmits a timing measurement message to the second communication node (122) as a beamformed transmission based on channel sounding feedback information received from the second communication node (122). The first communication node (110; 121) also receives an acknowledgement message from the second communication node (122) for the timing measurement message in the beamformed transmission. Furthermore, the first communication node (110; 121) determines the position of the second communication node (122) at least partly based on a transmission time of the timing measurement message and a reception time of the acknowledgement message. Embodi-
(Continued)

ments of the first communication node (110; 121) are also described. Embodiments herein also relate to a second communication.

21 Claims, 8 Drawing Sheets

(51) Int. Cl.
H04B 7/0456 (2017.01)
G01S 5/02 (2010.01)
H04B 7/06 (2006.01)
G01S 13/76 (2006.01)
H04W 84/12 (2009.01)

(52) U.S. Cl.
CPC .......... *G01S 5/0273* (2013.01); *G01S 13/765* (2013.01); *H04B 7/0456* (2013.01); *H04B 7/06* (2013.01); *H04B 7/063* (2013.01); *H04B 7/0639* (2013.01); *H04B 7/0695* (2013.01); *H04W 84/12* (2013.01)

(58) Field of Classification Search
USPC .............................. 455/456.1, 456.5, 456.6
See application file for complete search history.

(56) References Cited

U.S. PATENT DOCUMENTS

| | | | |
|---|---|---|---|
| 2016/0202344 A1 | 7/2016 | Sanderovich et al. | |
| 2016/0274229 A1 | 9/2016 | Oh et al. | |

FOREIGN PATENT DOCUMENTS

| | | |
|---|---|---|
| CN | 105492922 | 4/2016 |
| CN | 105579864 A | 5/2016 |
| JP | 2016 500942 A | 1/2016 |
| JP | 2016 514250 A | 5/2016 |
| KR | 20150052753 A | 5/2015 |
| WO | 2012 093794 A2 | 7/2012 |
| WO | 2014 052879 A1 | 4/2014 |
| WO | 2014 137391 A1 | 9/2014 |
| WO | 2015 041708 A1 | 3/2015 |
| WO | 2015 068993 A1 | 5/2015 |
| WO | 2015130712 A1 | 9/2015 |

OTHER PUBLICATIONS

3GPP TSG-RAN WG6#1; Gothenburg, Sweden; Source: Nokia, Alcatel-Lucent Shanghai Bell; Title: New WID on Radio Interface Enhancements for EC-GSM-IoT (R6-160092)—Sep. 22-26, 2016.
3GPP TS 43.064 v13.2.0; Technical Specification; 3rd Generation Partnership Project; Technical Specification Group GSM/Edge Radio Access Network; General Packet Radio Service (GPRS); Overall Description of the GPRS Radio Interface; Stage 2 (Release 13)—May 2016.
PCT Written Opinion of the International Searching Authority for International application No. PCT/SE2016/050736—dated Mar. 29, 2017.
Supplementary European Search Report for Application No. Pat. No. 16911748.8/3491866—dated Jul. 1, 2019.
Chinese Office Action issued for Application No. 201680088169.4—dated Apr. 17, 2020.
MIMO for GNP, submission by Assaf Kasher (Intel), doc: IEEE802.11—Nov. 10, 2015.
NGP AOA Use Cases, submission by Yasantha Rajakarunanayake (MediaTek), doc: IEEE 802.11-15/0838r1—Jun. 16, 2015.
Part 11: Wireless LAN Medium Access Control (MAC) and Physical Layer (PHY) Specification; Amendment 4: Enhancements for Very High Throughput for Operation in Bands Below 6 Ghz; IEEE Computer Society; IEEE Standard for Information technology—Telecommunications and information exchange between systems, Local and metropolitan area networks, Specific Requirements; IEEE Std 802.11ac 2013—2013.
JP Notice of Rejection issued for Patent Application No. 2019-504884, date prepared: May 21, 2020—dated Jun. 2, 2020.
Search Report issued by the Brazilian Federal Public Service Ministry of Economy, National Institute of Industrial Property issued for BR112019001617-1—dated Aug. 11, 2020.

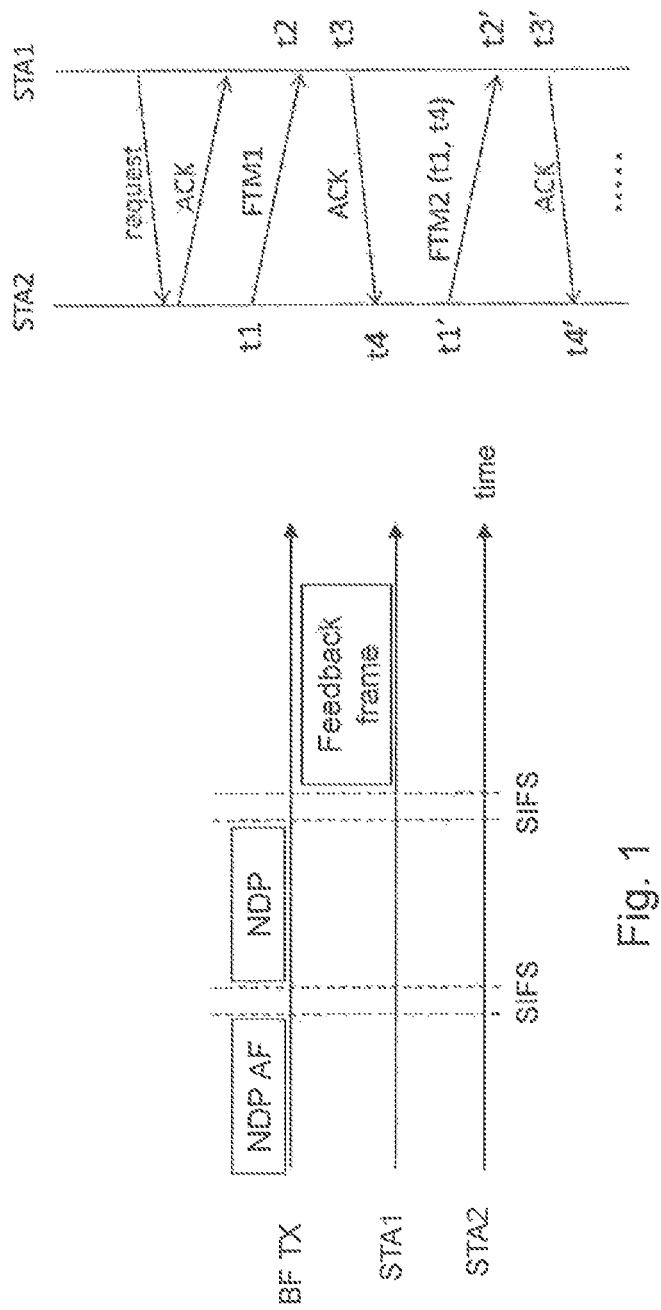

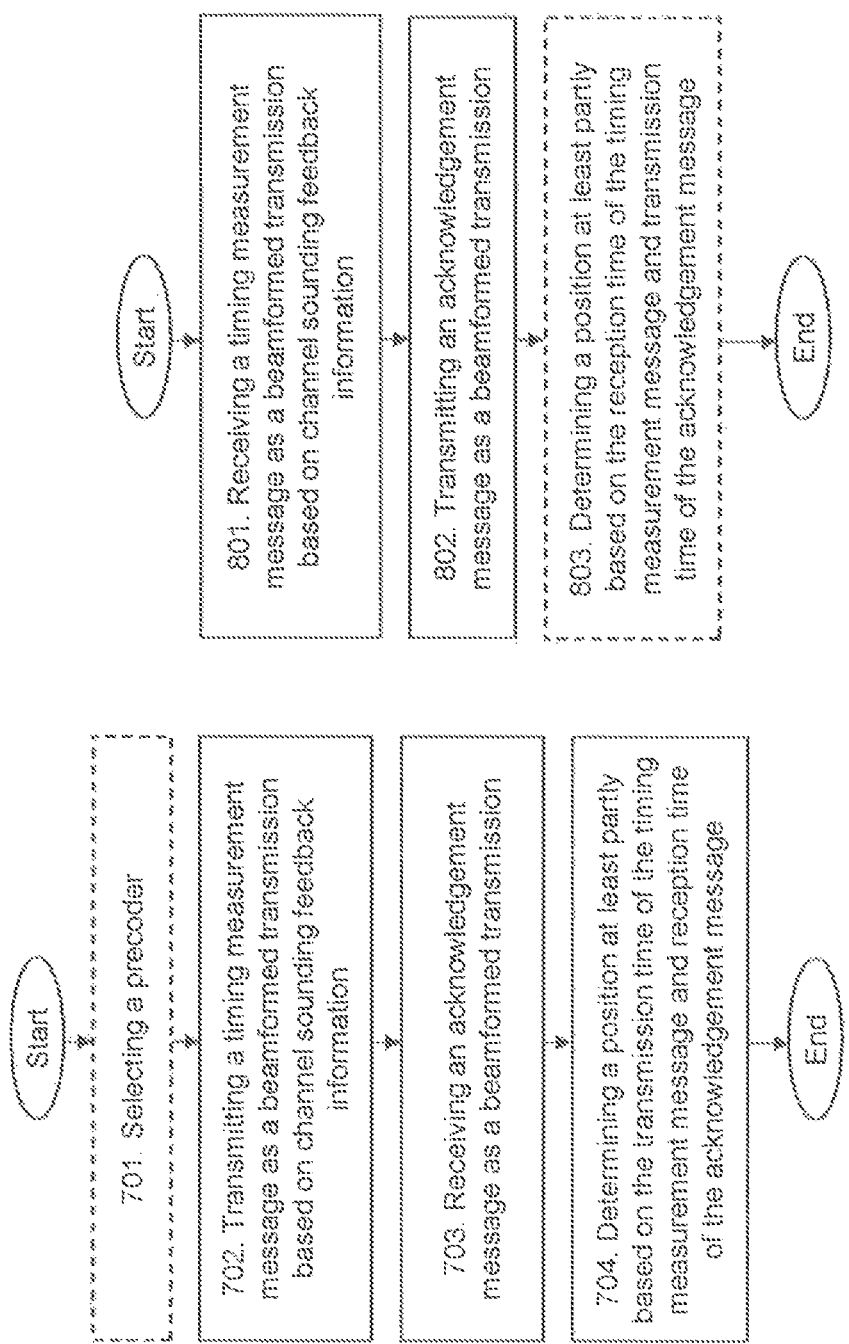

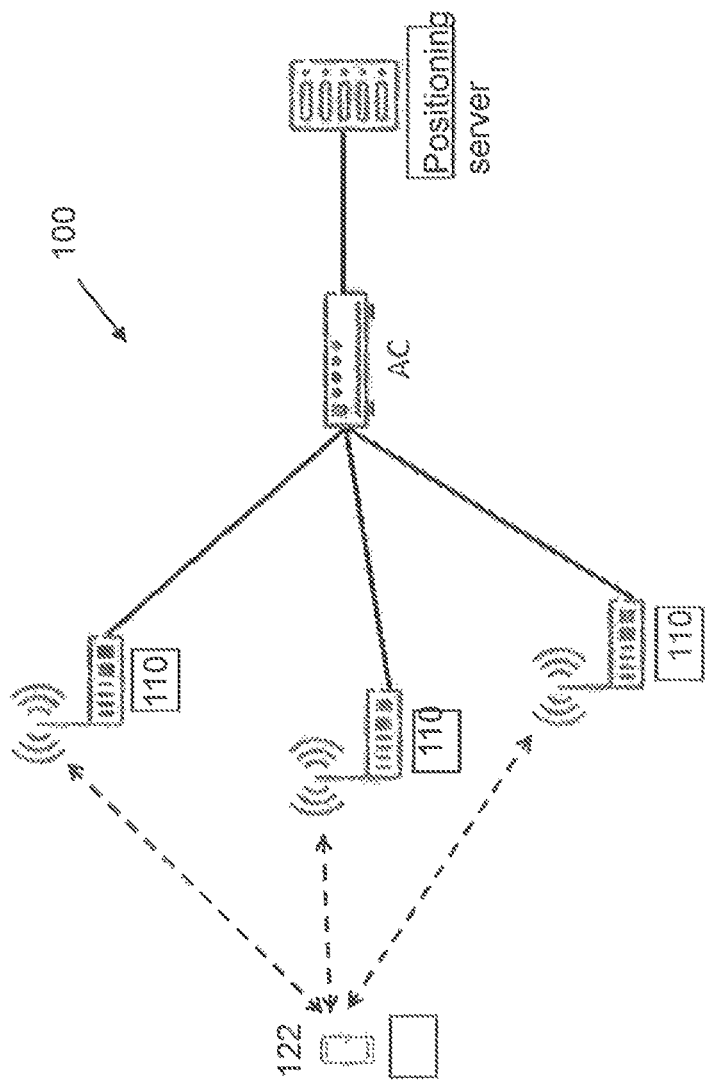

COMMUNICATION NODES AND METHODS THEREIN FOR POSITIONING IN A WIRELESS COMMUNICATIONS NETWORK

TECHNICAL FIELD

Embodiments herein relate to positioning in a wireless communications network. In particular, embodiments herein relate to a first communication node and method therein for determining the position of a second communication node in a wireless communications network. Also, embodiments herein relate to a second communication node and method therein for enabling positioning of the second communication node in a first communication node in a wireless communications network.

BACKGROUND

In the standardized IEEE 802.11 Wireless LAN, WLAN, which commonly also may be referred to as a Wi-Fi network, a Basic Serving Set, BSS, is regarded the basic building block of this wireless communications network. The BSS comprise an Access Point, AP, and a number of Stations, STAs, located within a certain coverage area or cell being served by the AP. Hereinafter, an AP or a STA in a WLAN may also be referred to as communication nodes in a wireless communications network.

Within a BSS, the transmission between the AP and the STAs is typically performed in a distributed manner. This means that before a transmission, a STA may first sense the transmission medium for a specific period of time. If the transmission medium is deemed idle, then access may be assigned to this STA for transmission; otherwise, the STA typically has to wait a random back-off period and then again check whether the transmission medium is idle and thus available to the STA. The random back-off period provides a collision avoidance mechanism for multiple STAs that wish to transmit in the same BSS. The standardized IEEE 802.11 WLAN may thus be seen as one example of a wireless communications network using contention-based transmission resources of the same frequency or channel.

Beamforming

Use of multi-antenna techniques may increase signal quality. By spreading the total transmission power wisely over multiple antennas, an array gain can be achieved which increases the Signal-to-Noise-ratio, SINR, at the receiver. The transmitted signal from each antenna is formed in such way that the received signal from each antenna adds up coherently at the receiver. This is referred to as beamforming. The precoding describe how to form the transmitted signal on each antenna in the antenna array in order to form a beam in order to improve the SINR.

As the APs within BSSs may be equipped with multiple antennas, beamforming is enabled and may be used to improve WLAN in terms of performance, reliability and coverage. Beamforming allowing a transmitting AP in a BSS to focus energy towards a specific STA in order to substantially improve the Signal-to-Noise Ratio, SINR, of the transmission to that specific STA was introduced in IEEE 802.11n standard. This advantageously also has the benefit of reducing the interference to other adjacent BSSs as compared to conventional omni-directional transmission.

In the IEEE 802.11ac-2013 standard, so-called explicit beamforming has been standardized in which the beamforming requires an explicit channel measurement by specific channel sounding frames. The channel sounding frames are then used for channel calibration in order to determine how to radiate energy in the desired direction. This channel sounding procedure is based on Non-Data Packets, NDPs, and is illustrated in the signaling scheme in FIG. 1.

In FIG. 1, the beamforming transmitter, BF TX, first transmits a NDP Announcement frame, NDP AF. This is used to gain control of the channel. The intended recipient of the upcoming transmission, such as, e.g. STA1, will receive and respond to the NDP AF, while other STAs receiving the NDP AF, such as, e.g. STA2, will defer channel access in order not to interfere with the upcoming transmission. Then, the BF TX transmits a NDP frame. The NDP frame is equivalent to a regular frame, but with its data part removed. Hence, this NDP frame mainly comprises training signals through which the channel may be properly estimated. After receiving the NDP frame, the STA1 estimates the channel through the training part of the NDP frame and transmits a feedback frame back to the BF TX. The feedback frame may be a Very-High Throughput, VHT, compressed beamforming frame that comprises information on the channel state between the BF TX and STA1 as measured using the NDP. The VHT compressed beamforming frame provides a steering matrix compressed via Givens rotation, which is able to save a significant amount of overhead compared to no-compressed beamforming matrices. Upon receiving the feedback frame, the BF TX uses the feedback steering matrix to calculate the weighting matrix for the beamforming towards the STA1. Furthermore, support for performing a similar type of beamforming transmission to multiple receivers simultaneously has also been included in the IEEE 802.11ac-2013 standard. This may also be referred to as multi-user MIMO beamforming.

Specially, the quantized information about the steering matrix is in a form of angles. For example, consider a general MIMO model as described in Eq. 1:

$$Y = Hx + n \quad \text{(Eq. 1)}$$

By using Singular Value Decomposition, SVD, the MIMO channel H can be decomposed into Eq. 2:

$$H = UDV \quad \text{(Eq. 2)}$$

where U and V are both unitary matrices, and D is a diagonal matrix consisting of the singular values of H as its diagonal elements. In order to perform eigen-subspace beamforming, the matrix V needs to be fed back to the AP. In practice, due to the limited bit size in the feedback channel, V has to be quantized, and the AP receives a quantized version of V. By applying Given's rotation, the unitary matrix V may fully be described by only a few angles. This is shown in Table 1 wherein the number of such angles is specified for different MIMO sizes.

TABLE 1

Angles for compressed beamforming matrices

| M × N | Number of angles | Angles |
|---|---|---|
| 2 × 1 | 2 | $\phi_{1,1}, \psi_{2,1}$ |
| 2 × 2 | 2 | $\phi_{1,1}, \psi_{2,1}$ |
| 3 × 1 | 4 | $\phi_{1,1}, \phi_{2,1}, \psi_{2,1}, \psi_{3,1}$ |
| 3 × 2 | 6 | $\phi_{1,1}, \phi_{2,1}, \psi_{2,1}, \psi_{3,1}, \phi_{2,2}, \psi_{3,2}$ |
| 3 × 3 | 6 | $\phi_{1,1}, \phi_{2,1}, \psi_{2,1}, \psi_{3,1}, \phi_{2,2}, \psi_{3,2}$ |
| 4 × 1 | 6 | $\phi_{1,1}, \phi_{2,1}, \phi_{3,1}, \psi_{2,1}, \psi_{3,1}, \psi_{4,1}$ |
| 4 × 2 | 10 | $\phi_{1,1}, \phi_{2,1}, \phi_{3,1}, \psi_{2,1}, \psi_{3,1}, \psi_{4,1}, \phi_{2,2}, \phi_{3,2}, \psi_{3,2}, \psi_{4,2}$ |
| 4 × 3 | 12 | $\phi_{1,1}, \phi_{2,1}, \phi_{3,1}, \psi_{2,1}, \psi_{3,1}, \psi_{4,1}, \phi_{2,2}, \phi_{3,2},$ |

TABLE 1-continued

Angles for compressed beamforming matrices

| M × N | Number of angles | Angles |
|---|---|---|
| 4 × 4 | 12 | $\psi_{3,2}, \psi_{4,2}, \phi_{3,3}, \psi_{4,3}$ <br> $\phi_{1,1}, \phi_{2,1}, \phi_{3,1}, \psi_{2,1}, \psi_{3,1}, \psi_{4,1}, \phi_{2,2}, \phi_{3,2},$ <br> $\psi_{3,2}, \psi_{4,2}, \phi_{3,3}, \psi_{4,3}$ |

Furthermore, the angles ϕ are quantized between 0 and $2\pi$ and the angles ψ are quantized between 0 and $\pi/2$, as given by Eqs. 3-4:

$$\varphi = \pi\left(\frac{1}{2^{b+2}} + \frac{k}{2^{b+1}}\right) k = 0, 1, \ldots, 2^{b+2} - 1 \quad \text{(Eqs. 3-4)}$$

$$\psi = \pi\left(\frac{1}{2^{b+2}} + \frac{k}{2^{b+1}}\right) k = 0, 1, \ldots, 2^b - 1$$

wherein b+2 is the number of bits used to quantize ϕ and b is the number of bits used to quantize ψ. The maximum value of b is 4 and may be further expanded to 7 for the MU-MIMO case.

At the AP side, given the quantized angle values contained in the sounding feedback, the precoding matrix, also referred to as a precoder, may be reconstructed.

Positioning

Several different ways may be used for determining the position of a STA or AP in a WLAN. These may exploit different signal features and thus, may require different measurements and apply corresponding algorithms.

For example, one way is to use a Received Signal Strength Indicator, RSSI, of the signal. As adopted in early versions of the IEEE 802.11 standard, the measurement of the distance-dependent signal strength, defined as RSSI, may be used to locate STAs. In principle, the distance between the STA and the AP could be reflected by the RSSI based on a certain attenuation model. However, the RSSI is sensitive to the radio environment and the behaviours of RSSI may be greatly different from the model. Hence, RSSI is usually part of a fingerprinting method that searches for a best match between a stored geographical map of multiple radio properties and the measured multiple radio properties. The RSSI is one such radio property.

According to another example, a time measurement based method of a signal may be used. Such methods may estimate a travel time between the STA and the AP, and translate the estimated travel time into a distance between the STA-AP pair. Then, triangulation may be used to determine the position of the STA. However, for the triangulation to work, there must be at least three such STA-AP pairs so that the position may be determined at the intersection of the three circles created by the measured distances. One way of estimating the travel time is by using Time-of-Arrival, ToA, measurements. Based on the received signal and prior knowledge of the transmitted reference signal, a STA or AP may determine a time delay of the first channel tap, which first channel tap corresponds to the ToA of the Line-of-Sight, LoS, signal. This time delay may then be translated into the distance between STA and AP. In the IEEE 802.11 standard, the ToA measurement method is supported in that the IEEE 802.11 standard specification has standardized the protocol and signalling for time-stamp measurement. In addition, given the ToA time difference between STA-AP pairs, other trilateration-based algorithms, such as, for example, hyperbolic trilateration, may also be applied. Another way of estimating the travel time is by using the Round-Trip-Time, RTT, of a signal. The RTT differs from ToA measurements in that it may measure the distance without requiring time synchronization between a transmitter and a receiver. Instead, it measures the time spent by a specific frame in traveling from the transmitter to the receiver and back again to the transmitter. The main challenge for these time measurement based methods is that received multipath signals comprising Non-LoS, NLoS, components may bring uncertainty into the time measurement.

According to yet another example, so called WiFi location fingerprinting may be used. Here, instead of determining a distance between the STA and the AP, the location of the STA is determined by comparing obtained sensing samples to a predetermined fingerprint map. The fingerprint map is normally constructed in advance during an offline phase and collects necessary fingerprints, i.e. distinct sensing values in the form of, for example, RSSIs, AoAs, ToAs, etc., for each reference point in the fingerprint map. The procedure of fingerprint map construction usually requires a testing STA to perform reference measurements either at each point of a fine coordinate grid, or by "walking around" the AP coverage area to collect sufficient fingerprint data.

According to a further example, a Fine Timing Measurement, FTM, procedure may be used, Since the IEEE 802.11-2012 standard release, the standard IEEE 802.11 standard has specified the use of timing measurement messages or frames. In short, a STA may transmit timing measurement frames addressed to a peer STA/AP, whereby a higher-layer protocol may synchronize the local clock time between STAs/APs based on the timing measurement frames. To this procedure, FTM has been added. FTM is characterized by a three-stage procedure which comprise a first stage of negotiation, a second stage of FTM implementation and a third stage of reporting of the time-stamp of the previous FTM message exchange. By using FTM, the time-stamp resolution is expected to improve to the order of 100 ps from that of 10 ns. This substantially decreases the theoretical limitation on the positioning inaccuracy.

FIG. 2 illustrates an example of an FTM procedure between two STAs, i.e. STA1 and STA2. First, a handshake between STA1 and STA2 is executed in the form of a ranging request message and an ACK response. Secondly, a first timing measurement frame, i.e. the FTM data packet, FTM1, is sent by STA2 and received by STA1. The Time-of-Departure, ToD, and the ToA of the FTM1, i.e. denoted t1 and t2 in FIG. 2 respectively, are recorded. An acknowledgement message, i.e. an acknowledgement data packet, ACK, associated with the FTM1 is then sent from STA1 and received by STA2. Here, the ToD and the ToA of the ACK, i.e. denoted t3 and t4 in FIG. 2 respectively, are recorded. Thereafter, a second-round of FTM messages is initiated where a second timing measurement frame, i.e. the second FTM data packet, FTM2, is transmitted and acknowledged. Here, the FTM2 also carry the timing measurement of t1 and t4 of the first FTM round. This means, for example, that, for a FTM message round, the RTT may be determined by the STA1 according to ((t4−t3)+(t2−t1))/2, whereby the clock offset between the two STAs may be compensated automatically, i.e. the offset may be determined according to (t4−t3)−(t2−t1))/2. It should be noted that the maximum number of FTM packets transmitted per FTM burst is currently 31.

However, in the FTM procedure described above, it should be noted that the transmission of the timing measurement messages or frames, i.e. the FTM data packets, FTM1 and FTM 2, is normally omnidirectional because the position of the STA2 is currently unknown. This means that received multipath signals comprising NLoS components could significantly compromise the positioning accuracy. This issue may become even more severe in indoor scenarios with more complex propagation environments.

FIG. 3 illustrated one example of such a complex propagation environment that may result in received multipath signals comprising NLoS components. In this case, in addition to a LoS path signal, #1, an NLoS path signal, #2, is reflected of a wall and also received by a targeted STA. In some cases, the NLoS path signal may be received at the targeted STA with a higher power than the LoS path signal. This may occur due to, for example, unfavourable fading affecting the LoS path signal. This will increase the risk of a faulty detection of the LoS path and accordingly, the error probability of the FTM procedure that is based on time measurements.

SUMMARY

It is an object of embodiments herein to improve positioning in a wireless communications network.

According to a first aspect of embodiments herein, the object is achieved by a method performed by a first communication node for determining the position of a second communication node in a wireless communications network. The first communication node transmits a timing measurement message to the second communication node as a beamformed transmission based on channel sounding feedback information received from the second communication node. The first communication node also receives an acknowledgement message from the second communication node for the timing measurement message in the beamformed transmission. Furthermore, the first communication node determines the position of the second communication node at least partly based on a transmission time of the timing measurement message and a reception time of the acknowledgement message.

According to a second aspect of embodiments herein, the object is achieved by a first communication node for determining the position of a second communication node in a wireless communications network. The first communication node is configured to transmit a timing measurement message to the second communication node as a beamformed transmission based on channel sounding feedback information received from the second communication node. The first communication node is also configured to receive an acknowledgement message from the second communication node for the timing measurement message in the beamformed transmission. Further, the first communication node is configured to determine the position of the second communication node at least partly based on a transmission time of the timing measurement message and a reception time of the acknowledgement message.

According to a third aspect of embodiments herein, the object is achieved by a method performed by a second communication node for enabling positioning of the second communication node in a first communication node in a wireless communications network. The second communication node receives a timing measurement message from the first communication node as a beamformed transmission based on channel sounding feedback information transmitted to the first communication node. The second communication node also transmits an acknowledgement message to the first communication node for the timing measurement message in the beamformed transmission.

According to a fourth aspect of embodiments herein, the object is achieved by a second communication node for enabling positioning of the second communication node in a first communication node in a wireless communications network. The second communication node is configured to receive a timing measurement message from the first communication node as a beamformed transmission based on channel sounding feedback information transmitted to the first communication node. The second communication node is also configured to transmit an acknowledgement message to the first communication node for the timing measurement message in the beamformed transmission.

According to a fifth aspect of embodiments herein, the object is achieved by a computer program, comprising instructions which, when executed on at least one processor, cause the at least one processor to carry out the methods described above. According to a sixth aspect of embodiments herein, the object is achieved by a carrier containing the computer program described above, wherein the carrier is one of an electronic signal, optical signal, radio signal, or computer readable storage medium.

By transmitting a timing measurement message as a beamformed transmission, more energy of the transmission will be focused in the direction of the second communication node. This will increase the SINR for the reception of the timing measurement message at the second communication node. Consequently, the detection of the LoS signal at the reception of the timing measurement message in the second communication node is improved, which will lead to an increased accuracy of the ToA estimates of the timing measurement message in the second communication node. Since the performance of the timing measurement procedure depends on the accuracy of the ToA estimates and the timing measurement procedure is used for the positioning of the second communication node, a more accurate positioning of the second communication node may accordingly be determined by the first communication node.

Hence, positioning in the wireless communications network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 1 is a signaling scheme illustrating a channel sounding procedure based on NDP according to the IEEE 802.11ac-2013 standard, FIG. 2 is a signaling scheme illustrating a FTM procedure according to the IEEE 802.11 standard, FIG. 7 is a flowchart depicting embodiments of a method performed by a first communication node, FIG. 8 is a flowchart depicting embodiments of a method performed by a second communication node, FIG. 13 is a block diagram of a network architecture for a wireless communications network comprising embodiments of a first and a second communication node.

DETAILED DESCRIPTION

Figure 4:
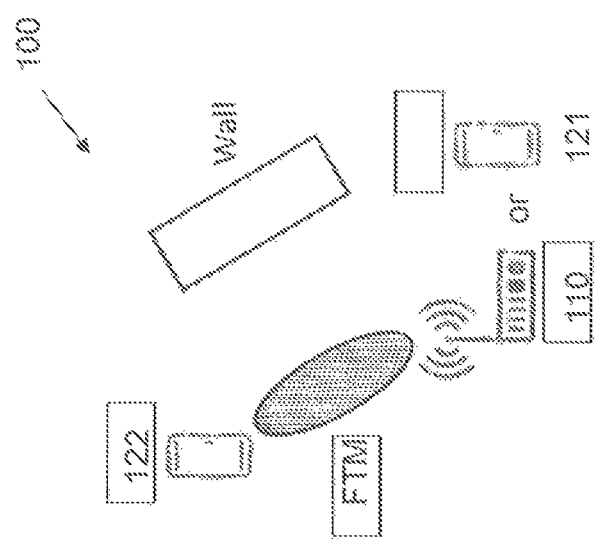
FIG. 4 is a schematic block diagram illustrating embodiments of a first and second communication node in a wireless communications network.
Figure 3:
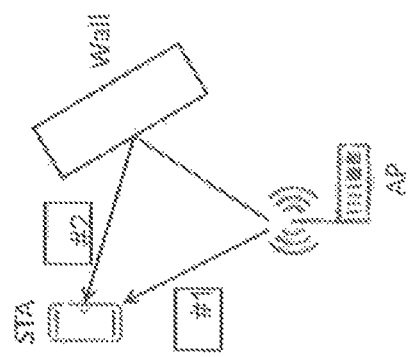
FIG. 3 is a schematic block diagram illustrating an example of a complex propagation environment that may result in received multipath signals comprising NLoS components.

The figures are schematic and simplified for clarity, and they merely show details which are essential to the understanding of the embodiments presented herein, while other details have been left out. Throughout, the same reference numerals are used for identical or corresponding parts or steps.

FIG. 4 shows an example of a first communication node 110, 121 and a second communication node 122 in a wireless communications network 100.

In the example scenario of FIG. 4, the first communication node 110, 121 may be an Access Point, AP 110. The AP 110 may be configured to provide WLAN coverage and serve stations, STAs, located within their respective, coverage area or cell, respectively. The WLAN provided by the AP 110 may be a WLAN according to the IEEE 802.11 standard. However, in some cases, the AP 110 may be a network node that forms part of a cellular, wireless or radio communication system providing radio coverage to the STAs over cellular transmission resources. Examples of such cellular, wireless or radio communication systems are, for example, LTE, LTE-Advanced, Wideband Code-Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM network, or other cellular networks or systems. Here, the AP 110 may e.g. be an eNB, eNodeB, or a Home Node B, a Home eNode B, femto Base Station (BS), pico BS or any other network unit capable to serve wireless devices or STAs on cellular transmission resources in the wireless communications network 100. The AP 110 may also be e.g. a radio base station, a base station controller, a network controller, a relay node, a repeater, a Ultra-Dense Network/Software-Defined Network (UDN/SDN) radio access node, a Remote Radio Unit (RRU) or a Remote Radio Head (RRH). In these cases, the AP 110 may be also be a network node that may use contention-based transmission resources of the same frequency, such as, e.g. WLANs. This may also be referred to as the cellular, wireless or radio communication system may being configured to operate in parts of the so-called unlicensed spectrum, i.e. unlicensed frequency bands which are shared, decentralized and not licensed to a particular type of scheduled wireless or radio communication, such as, e.g. the frequency bands of WLANs or WiFi-networks.

Alternatively, in the example scenario of FIG. 4, the first communication node 110, 121 may be a station, STA 121.

Also, in the example scenario of FIG. 4, the second communication node 122 may be a station, STA 122. The STA 122 may be located in the cell of the WLAN of the AP 110 and may thus be served by the AP 110. The STAs 121, 122 may e.g. be any kind of stations or wireless devices capable of communication via a WLAN. Optionally, the STAs 121, 122 may be configured for direct communication, such as, e.g. Device-to-Device, D2D, communication. For example, the STAs 121, 122 may be mobile phones, cellular phones, Personal Digital Assistants (PDAs), smart phones, tablets, sensors or actuators with wireless communication capabilities, sensors or actuators connected to or equipped with wireless devices, Machine Devices (MDs), Machine-Type-Communication (MTC) devices, Machine-to-Machine (M2M) communication devices, wireless devices with D2D capability, Customer-Premises Equipments (CPEs), Laptop-Mounted Equipments (LMEs), Laptop-Embedded Equipments (LEEs), etc. In FIG. 4, the first communication node 110, 121 and the second communication node 122, e.g. the AP 110 and the STA 122, may be referred to as a Basic Service Set, BSS.

Furthermore, although embodiments below are described with reference to FIG. 4, this should not be construed as limiting to the embodiments herein, but merely as an example made for illustrative purposes. It should also be noted that although the description of the embodiments herein is made in view of the IEEE 802.11 standard, along with specific examples regarding different amendments already developed or under development, the embodiments may also be applicable to other standards, as well as, for future amendments of IEEE 802.11 standard.

As part of the developing of the embodiments described herein, it has been noticed that the performance accuracy of a timing measurement procedure between the first communication node 110, 121 and the second communication node 122 is dependent upon on the accuracy of the ToA estimates made at the first communication node 110, 121 and at the second communication node 122.

It has also been noted that, when performing ToA estimates, the received signal may sometimes not be strong enough and may be embedded in noise and interference which makes it difficult to distinguish and determine the first channel tap indicating the LoS signal for the ToA estimate. One conventional method of determining ToA estimates at a receiver is to cross-correlate the received signal with the known transmitted reference signal of the transmitter. The output from the cross-correlation may be used to determine the first channel tap, which may be estimated by determining the first peak that is above a certain threshold level. It should be noted that setting the detection threshold level to a high value may result in that a weak LoS signal is missed, whereas setting the detection threshold level to a low value may result in falsely detecting noise as the LoS signal.

Figure 6:
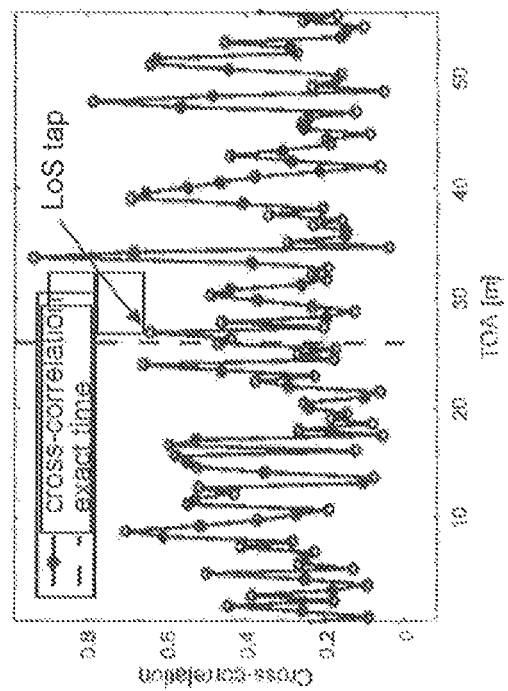
FIG. 6 is a diagram exemplifying a cross-correlation between a received signal and the known transmitted reference signal at low SINR.
Figure 5:
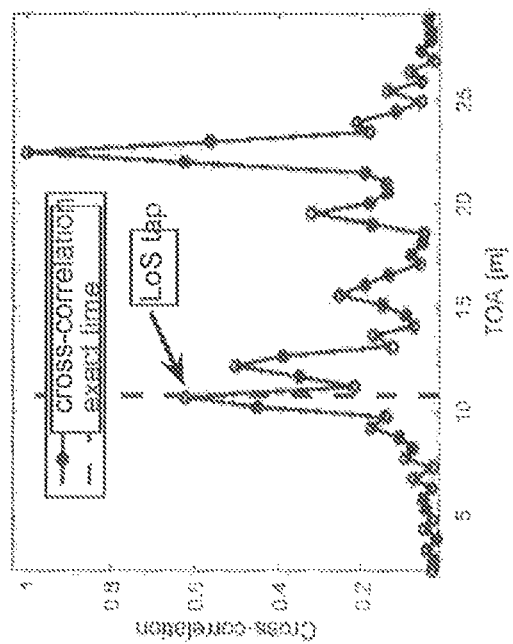
FIG. 5 is a diagram exemplifying a cross-correlation between a received signal and the known transmitted reference signal at high SINR.

FIGS. 5-6 shows diagrams exemplifying the cross-correlation between a received signal and the known transmitted reference signal at high and low SINR. FIGS. 5-6 also illustrate how the ToA accuracy depends on the SINR of the received signal. For the high SINR scenario depicted in FIG. 5, it may be noted that the first channel tap indicating the LoS signal may be detected by setting an adequate threshold level in respect to current the SINR level. However, for the low SINR scenario in FIG. 6, it is difficult to set adequate threshold level which accurately may estimate the first channel tap indicating the LoS signal. Therefore, it may be concluded that a higher SINR will improve the robustness of the detection of the first channel tap indicating the LoS signal. In other words, a higher SINR may mitigate the error in the ToA estimations that may be caused by a strong NLOS signal component.

This issue is addressed by the embodiments herein by incorporating beamforming in the timing measurement procedure. By transmitting a timing measurement message as a beamformed transmission, more energy of the transmission will be focused in the direction of the second communication node 122. This will increase the SINR for the reception of the timing measurement message at the second communication node 122. Consequently, the detection of the LoS signal at the reception of the timing measurement message in the second communication node 122 is improved, which will lead to an increased accuracy of the ToA estimates of the timing measurement message in the second communication node 122. Since the timing measurement procedure is used for the positioning of the second communication node 122 and the performance of the timing measurement procedure depends on the accuracy of the ToA estimates, a more accurate positioning of the second communication node 122 may accordingly be determined by the first communication node 110, 121. Hence, positioning in the wireless communications network 100 is improved.

According to some embodiments, this may be implemented on a protocol level as obtaining up-to-date beamforming information in the FTM protocol by incorporating a modified version of the explicit sounding procedure based on NDP according to the IEEE 802.11ac-2013 standard therein, and performing beamformed transmissions of the FTM data packets of the FTM protocol.

Example of embodiments of a method performed by a first communication node 110, 121 for determining the position of a second communication node 122 in a wireless communications network 100 will now be described with reference to the flowchart depicted in FIG. 7. FIG. 7 illustrates an example of actions or operations which may be taken by the AP 110 or the STA 121 as shown in FIG. 4. The method may comprise the following actions.

Action 701

Optionally, the first communication node 110, 121 may select a precoder for beamforming transmissions to the second communication node 122.

In some embodiments, the first communication node 110, 121 may select, based on channel sounding feedback information received from the second communication node 122, a precoder for the beamformed transmission of the timing measurement message from a codebook of different precoders dedicated for use in beamformed transmissions of timing measurement messages. This means that the first communication node 110, 121 may, for example, have a codebook with a fixed set of precoding matrices, i.e. precoders, designed for use in beamformed transmissions of timing measurement messages. The first communication node 110, 121 may in this case select the most suitable precoder of the precoders in the codebook for the beamformed transmission of the timing measurement message in Action 702 based on received channel sounding feedback information.

In some embodiments, the first communication node 110, 121 may perform the selection based on information indicating a precoder in channel sounding feedback information received from the second communication node 122. This means, for example, that the codebook may be known by both the first communication node 110, 121 and by the second communication node 122. In this case, the first communication node 110, 121 may receive a precoder index indicating a preferred precoder in the channel sounding feedback information from the second communication node 122, instead of the conventional complex channel sounding feedback information. This will significantly reduce the processing complexity and signalling overhead for the channel sounding feedback information.

Alternatively, the first communication node 110, 121 may perform the selection based on the channel sounding feedback information received from the second communication node 122 such that the received energy in the second communication node 122 is maximized. This means that the first communication node 110, 121 may select a precoding matrix or precoder that enhances the received energy of the LoS signal, i.e. the first channel tap, and not necessarily the precoder that maximizes the total received power at the second communication node 122.

Action 702

The first communication node 110, 121 transmits a timing measurement message to the second communication node 122 as a beamformed transmission based on channel sounding feedback information received from the second communication node 122.

In some embodiments, this may be performed by the first communication node 110, 121 by receiving channel sounding feedback information through a conventional NDP sounding procedure according to the IEEE 802.11ac-2013 standard with the second communication node 122. The first communication node 110, 121 may then recover a precoder for beamformed transmissions to the second communication node 122 based on this channel sounding feedback information. Advantageously, this requires no modification of the timing measurement procedure in order to incorporate a channel sounding feedback information mechanism. In case the precoder for the beamformed transmission is recovered through a conventional NDP sounding procedure, the first communication node 110, 121 may directly apply the recovered precoder to the beamformed transmission of the timing measurement message.

Figure 10:
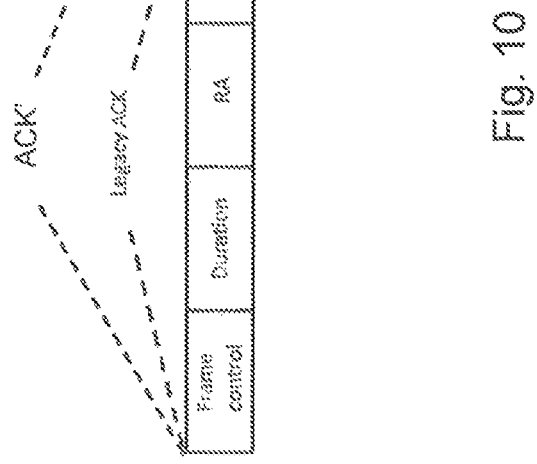
FIG. 10 is a schematic block diagram depicting an ACK frame according to embodiments of a first and a second communication node.
Figure 9:
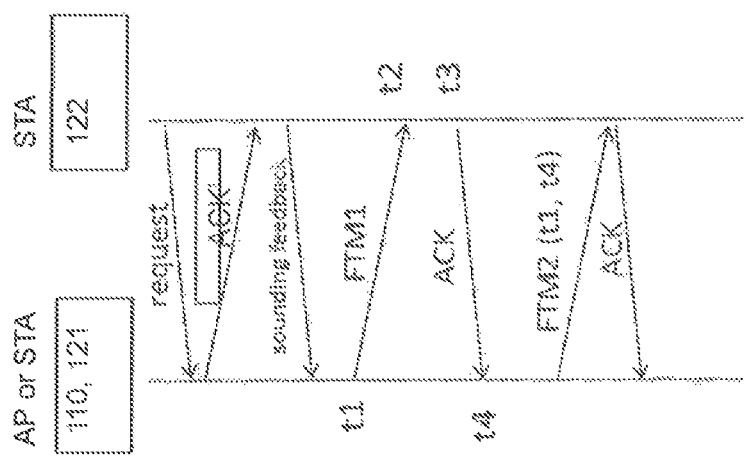
FIG. 9 is a signaling scheme illustrating signaling according to embodiments of a first and a second communication node.

Alternatively, the first communication node 110, 121 may perform the beamformed transmission of the timing measurement message using a precoder that is selected based on obtained channel sounding feedback information as described in Action 701. In some embodiments, the first communication node 110, 121 may obtain the channel sounding feedback information to be used in the beamformed transmission of the timing measurement message in that, prior to the transmission of the timing measurement message and in response to receiving a ranging request message from the second communication node 122, the first communication node 110, 121 may transmit an acknowledgement message to the ranging request message comprising channel sounding information to the second communication node 122. In this case, the first communication node 110, 121 may receive channel sounding feedback information from the second communication node 122 based on the channel sounding information in the transmitted acknowledgement message. In this case, this received channel sounding feedback information from the second communication node 122 may form the basis for the selection in Action 701. One example of this embodiment is shown in the signaling scheme in FIG. 9. In FIG. 9, the first communication node 110, 121 first receives a ranging request message from the second communication node 122. In responding to the ranging request message, the first communication node 110, 121 may transmit an acknowledgement message, ACK', that comprises channel sounding information, e.g. a training sequence for channel sounding purposes. One example of the format of this ACK' is illustrated in FIG. 10. In this example, a training data part, which comprises one or more VHT long training data fields, VHT-LTF, follows the legacy ACK format, i.e. the acknowledgement message conventionally used to respond to the ranging request messages. The first communication node 110, 121 may then receive a feedback frame from the second communication node 122 in response to the ACK'. The feedback frame may comprise channel sounding feedback information based on the training data part in the ACK'. Here, the feedback frame may be identical to a legacy feedback frame according to NDP procedure in the IEEE 802.11ac-2013 standard as described above. Alternatively, the sounding feedback frame may be configured to comprise a precoder index indicating one or more preferred precoders.

Figure 11:
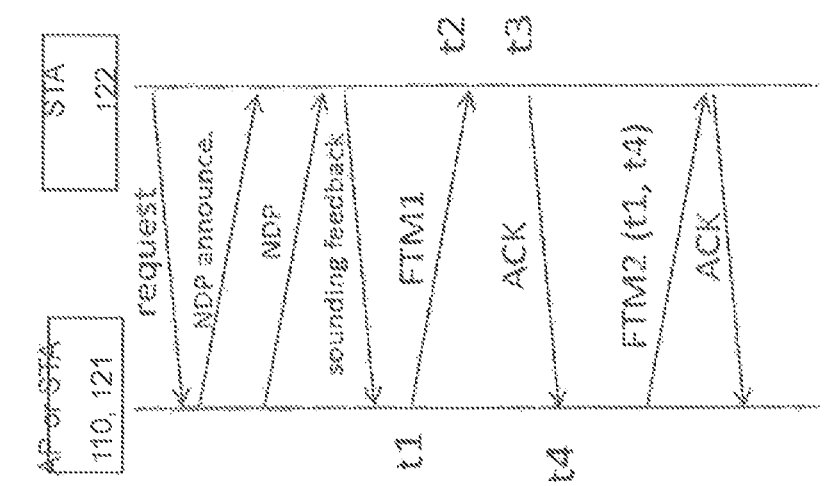
FIG. 11 is another signaling scheme illustrating signaling according to embodiments of a first and a second communication node.

In some embodiments, the first communication node 110, 121 may obtain the channel sounding feedback information to be used in the beamformed transmission of the timing measurement message in that, prior to the transmission of the timing measurement message and in response to receiving a ranging request message from the second communication node 122, the first communication node 110, 121 may perform at least one Non-Data Packet, NDP, channel sounding message exchange with the second communication node 122. In this case, this received channel sounding feedback information from the second communication node 122 via this NDP channel sounding message exchange may form the basis for the selection in Action 701. One example of this embodiment is shown in the signaling scheme in FIG. 11. In FIG. 11, the first communication node 110, 121 first receives a ranging request message from the second communication node 122. In responding to the ranging request message, the first communication node 110, 121 may perform an NDP channel sounding message exchange according to NDP procedure in the IEEE 802.11ac-2013 standard. This means that the first communication node 110, 121 may transmit a NDP announcement message followed by an NDP packet, and in response, receive a sound feedback frame from the second communication node 122. In other words, an NDP procedure according to the IEEE 802.11ac-2013 standard is incorporated into the timing measurement procedure, e.g. a FTM procedure.

According to some embodiments, the first communication node 110, 121 may perform the at least one NDP channel sounding message exchange with the second communication node 122 for two or more precoders. In this case, the first communication node 110, 121 may also transmit two or more timing measurement messages to the second communication node 122 as beamformed transmissions based on each of the two or more precoders. Further, the first communication node 110, 121 may receive acknowledgement messages from the second communication node 122 for the two or more transmitted timing measurement messages in the beamformed transmissions. For example, in case the first communication node 110, 121 is provided with two or more candidate precoders from the second communication node 122, the first communication node 110, 121 may transmit one timing measurement message per candidate precoder, for which the first communication node 110, 121 may consequently receive acknowledgment messages, i.e. one per candidate precoder. By this manner using inter-foliated multiple timing measurement procedures, i.e. where beamformed transmissions with different precoders are transmitted consecutively and consecutive responses are received, it is possible for the first communication node 110, 121 to consider and evaluate multiple precoders in an efficient manner.

Figure 12:
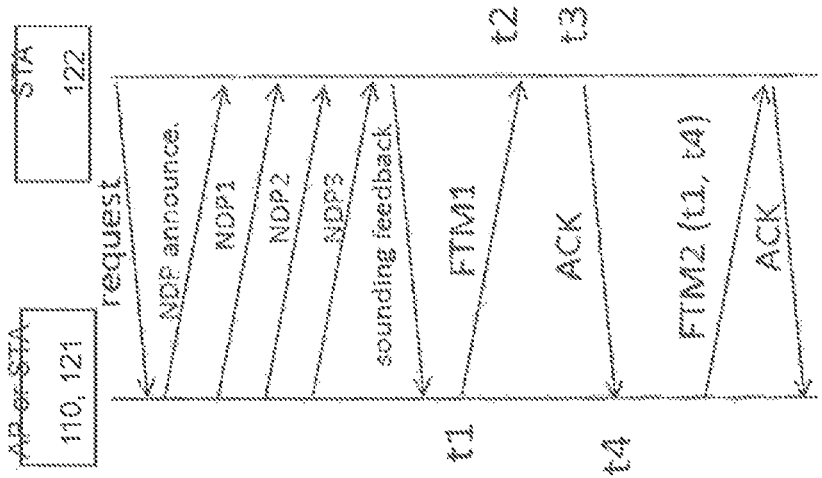
FIG. 12 is yet another signaling scheme illustrating signaling according to embodiments of a first and a second communication node.

Optionally, in some embodiments, the first communication node 110, 121 may perform two or more NDP channel sounding message exchanges with the second communication node 122, one for each of the two or more precoders. One example of this embodiment is shown in the signaling scheme in FIG. 12. In FIG. 12, the first communication node 110, 121 transmits three consecutive NDP data packets with three different precoders, respectively, to the second communication node 122. Then, the first communication node 110, 121 receives a response from the second communication node 122 comprising the channel sounding feedback information for the transmitted NDP data packets. Alternatively, the first communication node 110, 121 may transmit a single NDP data packet, which single NDP data packet comprises consecutive training signals for each of the three different precoders, respectively.

In some embodiments, the first communication node 110, 121 may also receive information from the second communication node 122, e.g. in the ranging request message or in a sounding feedback frame, indicating that the second communication node 122 is capable of performing the above mentioned inter-foliated multiple timing measurement procedures. In this case, the first communication node 110, 121 may configure the second communication node 122 to perform the inter-foliated multiple timing measurement procedures by transmitting information indicating that inter-foliated multiple timing measurement procedures is to be used. The first communication node 110, 121 may transmit this information in an NDP data packet or in the timing measurement message. The information may, for example, be a binary indicator or a number indicating the number of precoders to be used. According to one example, the information may be indicator in the timing measurement message indicating whether the timing measurement message is the last precoder or if more is to be followed.

In some embodiments, the first communication node 110, 121 may comprise applications which require regular positioning information updates. Since the multipath propagation signal paths may change relatively slowly at some speeds, it may be relevant for the first communication node 110, 121 to only employ the inter-foliated multiple timing measurement procedures at some of time instances when gathering positioning information. Optionally, it may be relevant for the first communication node 110, 121 to only employ the inter-foliated multiple timing measurement procedures while only exchanging packets for one precoder, or even use a uniform precoder without beamforming gains at intermediate time instances.

Additionally, according to some embodiments, the first communication node 110, 121 may also repeat transmissions of the acknowledgement message or NDP channel sounding message for at least a subset of all beamforming directions. This means, for example, that the first communication node 110, 121 may apply the channel sounding procedure and beamforming in a scanning manner, in which the first communication node 110, 121 may search the beam-space with a high antenna gain in order to detect the LoS direction with increased probability.

In some cases, the first communication node 110, 121 may have no prior knowledge of the LoS direction of the second communication node 122. In this case, the above mentioned scanning over the beam-space may be performed, wherein the first communication node 110, 121 repeats the channel sounding procedure for beamforming for at least a subset of all directions of the beam-space. Thereafter, the first communication node 110, 121 may determine the LoS direction of the second communication node 122 by, for example, a minimization of the obtained travel times of radio waves. This may, for example, be performed by the first communication node 110, 121 by using analogue beamforming techniques in which one beam direction is applied for each scan time instant. Alternatively, this may be performed by the first communication node 110, 121 by using digital beamforming techniques where baseband processing applies more than one beam in different directions. According to another example, this may be performed the first communication node 110, 121 by using hybrid beamforming techniques, in analogue and digital beamforming is combined. Which of the above mentioned techniques that is used by the first communication node 110, 121, may depend on the hardware capabilities of the first communication node 110, 121.

In some embodiments, the timing measurement message may be a Fine Timing Measurement, FTM, frame or data packet. In this case, the timing measurement procedure may be a FTM procedure. Here, by incorporating a channel sounding procedure for beamforming in the FTM protocol, the usage of the transmission medium may be significantly reduced as compared to separately performing a channel sounding procedure and the FTM procedure.

Action 703

In response to the timing measurement message in Action 702, the first communication node 110, 121 receives an acknowledgement message from the second communication node 122 for the transmitted timing measurement message in the beamformed transmission.

Action 704

After receiving the acknowledgement message as described in Action 703, the first communication node 110, 121 determines the position of the second communication node 122 at least partly based on a transmission time of the timing measurement message and a reception time of the acknowledgement message. This will significantly improve the positioning of the second communication node 122 by the first communication node 110, 121 since the performance of the timing measurement procedure used for the positioning of the second communication node 122 depends on the accuracy of the ToA estimates, which will be improved due to the increased SINR when receiving the beamformed timing measurement message and thus enable a more accurate detection of the LoS signal.

The transmission time of the timing measurement message may be a transmission time indicated by a time stamp in the signal comprising the timing measurement message. The reception time of the acknowledgement message may be the ToA of the signal comprising the acknowledgement message. The ToA may be based on the LoS signal, i.e. the time delay of the first detected channel tap of the signal comprising the acknowledgement message. The ToA may also be based on the time delay of any or multiple detected channel taps of the signal comprising the acknowledgement message. Further, the ToA of the signal comprising the acknowledgement message may be indicated by a time stamp of the signal comprising the acknowledgement message.

It should here be noted that the first communication node 110, 121 will also, upon receiving the acknowledgment message from the second communication node 122, transmit at least a second timing measurement message as a beamformed transmission to the second communication node 122 comprising the transmission time of the first timing measurement message and the reception time of the acknowledgement message. This transmission may be performed as part of the standard FTM procedure as described in the background part above. Furthermore, it should be noted that, as for the timing measurement message to the second communication node 122 described above, any further transmissions of timing measurement messages to the second communication node 122 performed as part of the standard FTM procedure may also be beamformed in the same manner.

It should also be noted that, according to some embodiments, the first communication node 110, 121 may, when the timing measurement messages are not received properly by the second communication node 122, e.g. when no acknowledgement message, ACK, is received from the second communication node 122, override the used precoder. This means that the first communication node 110, 121 may apply another precoder, or apply non-precoding, to the beamformed transmission of its timing measurement messages instead. In this case, the first communication node 110, 121 may also transmit the changed precoder to the second communication node 122. This will assist the signal processing in the second communication node 122 and further improve SINR of received beamformed transmission of timing measurement messages.

Alternatively, in case beamformed transmission of timing measurement messages are not received properly by the second communication node 122, the first communication node 110, 121 may trigger a new channel sounding procedure before applying the beamforming to transmissions of timing measurement messages.

It should further be noted that in order to perform beamforming transmission from the first communication node 110, 121 to the second communication node 122, and vice-versa, both the first communication node 110, 121 and the second communication node 122 are required to comprise multiple antennas and be capable of supporting a channel sounding procedure, e.g. the NDP procedure of the IEEE 802.11ac standard. In some embodiments, the first communication node 110, 121 and the second communication node 122 may exchange channel sounding procedure capabilities with each other in order to ensure that the relevant channel sounding procedure is supported. For example, if both the first communication node 110, 121 and the second communication node 122 supports the relevant channel sounding procedure, the first communication node 110, 121 may proceed with the method according to the above described Actions 701-704. Otherwise, the first communication node 110, 121 may proceed continues with a conventional timing measurement procedure.

Example of embodiments of a method performed by a second communication node 122 for enabling positioning of the second communication node 122 in a first communication node 110, 121 in a wireless communications network 100 will now be described with reference to the flowchart depicted in FIG. 8. FIG. 8 illustrates an example of actions or operations which may be taken by the STA 122 as shown in FIG. 4. The method may comprise the following actions.

Action 801

First, the second communication node 122 receives a timing measurement message from the first communication node 110, 121 as a beamformed transmission based on channel sounding feedback information transmitted to the first communication node 110, 121. In some embodiments, the timing measurement message may be a Fine Timing Measurement, FTM, frame or data packet.

In some embodiments, the channel sounding feedback information transmitted to the first communication node 110, 121 may comprise information indicating a precoder for a beamformed transmission of a timing measurement message from a codebook of different precoders dedicated for use in beamformed transmissions of timing measurement messages.

In some embodiments, in response to transmitting a ranging request message from the second communication node 122, the second communication node 122 may receive an acknowledgement message comprising channel sounding information from the first communication node 110, 121. In this case, the second communication node 122 may transmit channel sounding feedback information to the first communication node 110, 121 based on the channel sounding information in the received acknowledgement message.

In some embodiments, in response to transmitting a ranging request message to the first communication node 110, 121, the second communication node 122 may perform at least one Non-Data Packet, NDP, channel sounding message exchange with the first communication node 110, 121. Here, according to some embodiments, the second communication node 122 may perform the at least one NDP channel sounding message exchange with the first communication node 110, 121 for two or more precoders. In this case, the second communication node 122 may also receive two or more timing measurement messages from the first communication node 110, 121 as beamformed transmissions based on each of the two or more precoders. Further, the second communication node 122 may transmit acknowledgement messages to the first communication node 110, 121 for the two or more transmitted timing measurement messages in the beamformed transmissions.

Action 802

After receiving the timing measurement message in Action 801, the second communication node 122 transmits an acknowledgement message to the first communication node 110, 121 for the timing measurement message in the beamformed transmission. In this way, the second communication node 122 will enable a significant improvement of the positioning of the second communication node 122 by the first communication node 110, 121 since the performance of the timing measurement procedure used for the positioning of the second communication node 122 by the first communication node 110, 121 depends on the accuracy of the ToA estimates. The ToA estimates of the second communication node 122 will be significantly improved due to the increased SINR when receiving beamformed timing measurement messages from the first communication node 110, 121, and thus more a more accurate detection of the LoS signal may be performed in the second communication node 122.

Action 803

Optionally, the second communication node 122 may determine the position of the first communication node 110, 121 at least partly based on the reception time of the timing measurement message and the transmission time of the acknowledgement message.

The reception time of the timing measurement message may be the ToA of the signal comprising the timing measurement message. The ToA may be based on the LoS signal, i.e. the time delay of the first detected channel tap of the signal comprising the timing measurement message. The ToA may also be based on the time delay of any or multiple detected channel taps of the signal comprising the timing measurement message. Further, the ToA of the signal comprising the timing measurement message may be indicated by a time stamp of the signal comprising the timing measurement message. The transmission time of the acknowledgement message may be a transmission time indicated by a time stamp in the signal comprising the acknowledgement message.

It should here be noted that the second communication node 122 will also, after sending the acknowledgment message to the first communication node 110, 121, receive at least a second timing measurement message as a beamformed transmission from the first communication node 110, 121 comprising the transmission time of the first timing measurement message and the reception time of the acknowledgement message. This transmission may be performed as part of the standard FTM procedure as described in the background part above. Furthermore, it should be noted that, as for the timing measurement messages from the first communication node 110, 121 described above, any further reception of timing measurement messages from the first communication node 110, 121 performed as part of the standard FTM procedure may also be beamformed in the same manner.

Here, it should be noted that the second communication node 122 may derive the precoder based on reciprocity.

FIG. 13 is a block diagram of an example of a network architecture for a wireless communications network 100 comprising embodiments of the first communication node 110, 121 and the second communication node 122. The wireless communications network 100 may here incorporate three different first communication nodes 110, 121. In this case, three different Access Points, APs 110. The wireless communications network 100 may also comprise an Access Controller, AC, and a positioning server.

The three different APs 110 may be utilized to exchange dedicated frames and/or beacons with the second communication node 122 for positioning purposes. These frames and/or beacons may comprise positioning-related information, such as, for example, time stamp, path loss information, etc., based on which the second communication node 122 may perform necessary measurements. The AC may deliver configuration information to the APs 110 to control their behaviours for the positioning. In the opposite direction, the measurement results collected at the APs 110 may be reported to the AC. Then, the AC may processes the measurement results and report the processed data to the positioning server. In certain configurations, the APs 110 may also be able to report the collected data directly to the positioning server. The positioning server may determine the location of the second communication node 122 based on the reported data and other available information in its database.

In this type of network architecture for a wireless communications network 100, the APs 110 may, according to some embodiments, include the channel sounding information, such as, e.g. the precoders used in the timing measurement procedure, in a timing measurement procedure report to the AC. This enables the configuration of a database associated with the positioning server of beamformed timing measurement procedure information. Also, if the database is configured based on other positioning information, such as, e.g. GNSS or user-defined positions, then the database may be used for correlating the beamformed timing measurement procedure information.

The APs 110 may provide information to the position server that is related to the positioning of the second communication node 122. This information may comprise, for example, the precoders used, and/or the number of precoders that have been deemed necessary for the timing measurement procedure. Moreover, this information may also comprise information associated to the estimated position of the second communication node 122, thereby enabling a database configured with positioned multipath information.

Furthermore, in case some additional positioning information is available to the APs 110, such as, for example, GNSS information, user-defined position information, etc., then this information may be associated to such positioning and thereby enabling an independent database of information that can be used for correlation with timing measurement procedure reports of the beamformed timing measurement procedure information.

Figure 14:
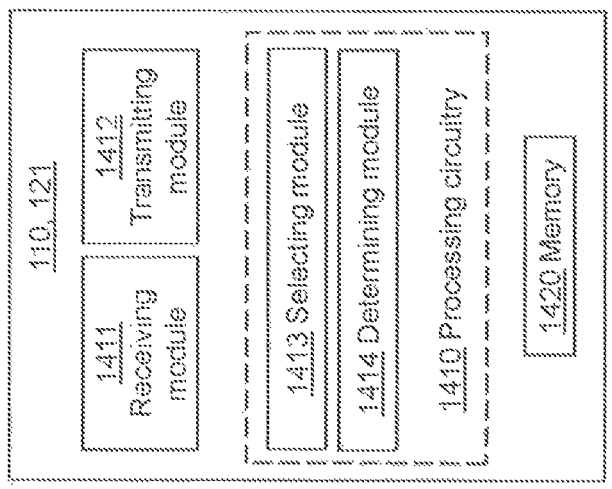
FIG. 14 is a schematic block diagram depicting embodiments of a first communication node.

To perform the method actions for determining the position of a second communication node 122 in a wireless communications network 100, first communication node 110, 121 may comprise the following arrangement depicted in FIG. 14. FIG. 14 shows a schematic block diagram of embodiments of the first communication node 110, 121. The embodiments of the first communication node 110, 121 described herein may be considered as independent embodiments or may be considered in any combination with each other to describe non-limiting examples of the example embodiments described herein.

The first communication node 110, 121 may comprise a processing circuitry 1410, a memory 1420 and at least one antenna (not shown). The first communication node 110, 121 may also comprise a receiving module 1411 and a transmitting module 1212. The receiving module 1411 and the transmitting module 1412 may comprise Radio Frequency, RF, circuitry and baseband processing circuitry. The receiving module 1411 and the transmitting module 1412 may also be co-located, such as, in a transceiver, and may also be said to form part of the processing circuitry 1410. In some embodiments, some or all of the functionality described above as being performed by the first communication node 110, 121 may be provided by the processing circuitry 1410 executing instructions stored on a computer-readable medium, such as, e.g. the memory 1420 shown in FIG. 14. Alternative embodiments of the first communication node 110, 121 may comprise additional components, such as, a selecting module 1413 and a determining module 1414, responsible for providing its functionality necessary to support the embodiments described herein.

The first communication node 110, 121 or processing circuitry 1410 is configured to, or may comprise the transmitting module 1412 being configured to, transmit a timing measurement message to the second communication node 122 as a beamformed transmission based on channel sounding feedback information received from the second communication node 122. Also, the first communication node 110, 121 or processing circuitry 1410 is configured to, or may comprise the receiving module 1412 being configured to, receive an acknowledgement message from the second communication node 122 for the timing measurement message in the beamformed transmission. Further, the first communication node 110, 121 or processing circuitry 1410 is configured to, or may comprise the transmitting module 1412 being configured to, determine the position of the second communication node 122 at least partly based on the transmission time of the timing measurement message and the reception time of the acknowledgement message.

In some embodiments, the first communication node 110, 121 or processing circuitry 1410 may be configured to, or may comprise the selecting module 1413 configured to, select, based on the channel sounding feedback information received from the second communication node 122, a precoder for the beamformed transmission of the timing measurement message from a codebook of different precoders dedicated for use in beamformed transmissions of timing measurement messages. In some embodiments, the first communication node 110, 121 or processing circuitry 1410 may be configured to, or may comprise the selecting module 1413 configured to, select the precoder based on information indicating a precoder in the channel sounding feedback information received from the second communication node 122. Alternatively, in some embodiments, the first communication node 110, 121 or processing circuitry 1410 may be configured to, or may comprise the selecting module 1413 configured to, select the precoder based on the channel sounding feedback information received from the second communication node 122 such that the received energy in the second communication node 122 is maximized.

In some embodiments, the first communication node 110, 121 or processing circuitry 1410 may be configured to, or may comprise the transmitting module 1412 configured to, prior to transmitting the timing measurement message and in response to receiving a ranging request message from the second communication node 122, transmit an acknowledgement message for the ranging request message comprising channel sounding information to the second communication node 122. In this case, the first communication node 110, 121 or processing circuitry 1410 may also be configured to, or may comprise the receiving module 1411 configured to, receive channel sounding feedback information from the second communication node 122 based on the channel sounding information in the transmitted acknowledgement message.

In some embodiments, the first communication node 110, 121 or processing circuitry 1410 may be configured to, or may comprise the receiving module 1411 and the transmitting module 1412 configured to, prior to the transmission of the timing measurement message and in response to receiving a ranging request message from the second communication node 122, perform at least one Non-Data Packet, NDP, channel sounding message exchange with the second communication node 122. In this case, the first communication node 110, 121 or processing circuitry 1410 may be configured to, or may comprise the receiving module 1411 and the transmitting module 1412 configured to, perform the at least one NDP channel sounding message exchange with the second communication node 122 for two or more precoders. If so, the first communication node 110, 121 or processing circuitry 1410 may also be configured to, or may also comprise the transmitting module 1412 configured to, transmit two or more timing measurement messages to the second communication node 122 as beamformed transmissions based on each of the two or more precoders. Also, in this case, the first communication node 110, 121 or processing circuitry 1410 may also be configured to, or may comprise the receiving module 1411 configured to, receive acknowledgement messages from the second communication node 122 for the two or more transmitted timing measurement messages in the beamformed transmissions.

In some embodiments, the first communication node 110, 121 or processing circuitry 1410 may be configured to, or may comprise the transmitting module 1412 configured to, repeat transmissions of the acknowledgement message or NDP channel sounding message for at least a subset of all beamforming directions. In some embodiments, the timing measurement message may be a Fine Timing Measurement, FTM, frame or data packet.

Furthermore, the embodiments of the first communication node 110, 121 for determining the position of a second communication node 122 in a wireless communications network 100 described above may be implemented through one or more processors, such as, the processing circuitry 1410 in the first communication node 110, 121 depicted in FIG. 14, together with computer program code for performing the functions and actions of the embodiments herein. The program code mentioned above may also be provided as a computer program product, for instance in the form of a data carrier, such as, e.g. an electronic signal, optical signal, radio signal, or computer-readable storage medium, carrying computer program code or code means for performing the embodiments herein when being loaded into the processing circuitry 1410 in the first communication node 110, 121, The computer program code may e.g. be provided as pure program code in the first communication node 110, 121 or on a server and downloaded to the first communication node 110, 121.

Those skilled in the art will also appreciate that the processing circuitry 1410 and the memory 1420 described above may refer to a combination of analog and digital circuits, and/or one or more processors configured with software and/or firmware, e.g. stored in a memory, that when executed by the one or more processors such as the processing circuitry 1420 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

It should be noted that the modules of the first communication node 110, 121 may in some embodiments be implemented as computer programs stored in memories, e.g. in the memory module 1420 in FIG. 14, for execution by processors, e.g. the processing module 1410 of FIG. 14.

Figure 15:
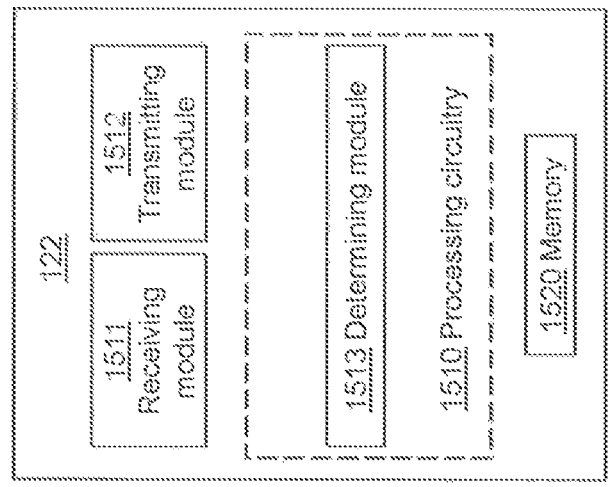
FIG. 15 is a schematic block diagram depicting embodiments of a second communication node.

To perform the method actions for enabling positioning of the second communication node 122 in a first communication node 110, 121 in a wireless communications network 100, the second communication node 122 may comprise the following arrangement depicted in FIG. 15. FIG. 15 shows a schematic block diagram of embodiments of the second communication node 122. The embodiments of the second communication node 122 described herein may be considered as independent embodiments or may be considered in any combination with each other to describe non-limiting examples of the example embodiments described herein.

The second communication node 122 may comprise a processing circuitry 1510, a memory 1520 and at least one antenna (not shown). The second communication node 122 may also comprise a receiving module 1511 and a transmitting module 1512. The receiving module 1511 and the transmitting module 1512 may comprise Radio Frequency, RF, circuitry and baseband processing circuitry. The receiving module 1511 and the transmitting module 1512 may also be co-located, such as, in a transceiver, and may also be said to form part of the processing circuitry 1510. In some embodiments, some or all of the functionality described above as being performed by the second communication node 122 may be provided by the processing circuitry 1510 executing instructions stored on a computer-readable medium, such as, e.g. the memory 1520 shown in FIG. 15. Alternative embodiments of the second communication node 122 may comprise additional components, such as, the determining module 1513 responsible for providing its functionality necessary to support the embodiments described herein.

The second communication node 122 or processing circuitry 1510 is configured to, or may comprise the receiving module 1311 configured to, receive a timing measurement message from the first communication node 110, 121 as a beamformed transmission based on channel sounding feedback information transmitted to the first communication node 110, 121. Also, the second communication node 122 or processing circuitry 1510 is configured to, or may comprise the transmitting module 1312 configured to, transmit an acknowledgement message to the first communication node 110, 121 for the timing measurement message in the beamformed transmission.

In some embodiments, the second communication node 122 or processing circuitry 1510 may be configured to, or may comprise the determining module 1513 configured to, determine the position of the first communication node 110, 121 at least partly based on the reception time of the timing measurement message and the transmission time of the acknowledgement message.

In some embodiments, the channel sounding feedback information transmitted to the first communication node 110, 121 may comprise information indicating a precoder for a beamformed transmission of a timing measurement message from a codebook of different precoders dedicated for use in beamformed transmissions of timing measurement messages.

In some embodiments, the second communication node 122 or processing circuitry 1510 may be configured to, or may comprise the receiving module 1511 configured to, in response to transmitting a ranging request message from the second communication node 122, receive an acknowledgement message comprising channel sounding information from the first communication node 110, 121. In this case, the second communication node 122 or processing circuitry 1510 may be configured to, or may comprise the transmitting module 1512 configured to, transmit channel sounding feedback information to the first communication node 110, 121 based on the channel sounding information in the received acknowledgement message.

In some embodiments, the second communication node 122 or processing circuitry 1510 may be configured to, or may comprise the receiving module 1511 and the transmitting module 1512 configured to, in response to transmitting a ranging request message to the first communication node 110, 121, perform at least one Non-Data Packet, NDP, channel sounding message exchange with the first communication node 110, 121. Here, according to some embodiments, the second communication node 122 or processing circuitry 1510 may be further configured to, or may comprise the receiving module 1511 and the transmitting module 1512 being further configured to, perform the at least one NDP channel sounding message exchange with the first communication node 110, 121 for two or more precoders. In this case, the second communication node 122 or processing circuitry 1510 may be further configured to, or may comprise the receiving module 1511 configured to, receive two or more timing measurement messages from the first communication node 110, 121 as beamformed transmissions based on each of the two or more precoders. Further, the second communication node 122 or processing circuitry 1510 may be further configured to, or may comprise the transmitting module 1512 configured to, transmit acknowledgement messages to the first communication node 110, 121 for the two or more transmitted timing measurement messages in the beamformed transmissions. In some embodiments, the timing measurement message maybe a Fine Timing Measurement, FTM, frame or data packet.

Furthermore, the embodiments of the second communication node 122 for enabling positioning of the second communication node 122 in a first communication node 110, 121 in a wireless communications network 100 described above may be implemented through one or more processors, such as, the processing circuitry 1510 in the second communication node 122 depicted in FIG. 15, together with computer program code for performing the functions and actions of the embodiments herein. The program code mentioned above may also be provided as a computer program product, for instance in the form of a data carrier, such as, e.g. an electronic signal, optical signal, radio signal, or computer-readable storage medium, carrying computer program code or code means for performing the embodiments herein when being loaded into the processing circuitry 1510 in the second communication node 122. The computer program code may e.g. be provided as pure program code in the second communication node 122 or on a server and downloaded to the second communication node 122.

Those skilled in the art will also appreciate that the processing circuitry 1510 and the memory 1520 described above may refer to a combination of analog and digital circuits, and/or one or more processors configured with software and/or firmware, e.g. stored in a memory, that when executed by the one or more processors such as the processing circuitry 1520 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

It should be noted that the modules of the second communication node 122 may in some embodiments be implemented as computer programs stored in memories, e.g. in the memory module 1520 in FIG. 15, for execution by processors, e.g. the processing modules 1510 of FIG. 15.

The terminology used in the detailed description of the particular embodiments illustrated in the accompanying drawings is not intended to be limiting of the described first communication node 110, 121, the second communication node 122 and methods therein which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

ABBREVIATIONS

ACK Acknowledgement
AP Access Point
AoA Angle of Arrival
ToA Time of Arrival
ToD Time of Departure
STA Station
ACK Acknowledgement
OBSS Overlapping Basic Service Sets
BSS Basic Serving Set
WLAN Wireless Local Area Network
MU-MIMO Multi-User Multiple-In-Multiple-Out
SNR Signal-to-Noise-Ratio
TX Transmitter
RX Receiver
BF Beamforming
NDP Non-Data Packets
NDP AF NDP Announcement Frame
VHT Very-High Throughput
IE Information Element
SIFS Short Interframe Space
RSSI Received Signal Strength Indicator
FTM Fine Timing Measurement
LoS Line-of-Sight
NLoS Non-LoS
RTT Round-Trip-Time

The invention claimed is:

1. A method performed by a first communication node for determining the position of a second communication node in a wireless communications network, the method comprising
transmitting a timing measurement message to the second communication node as a beamformed transmission based on channel sounding feedback information received from the second communication node;
receiving an acknowledgement message from the second communication node for the timing measurement message in the beamformed transmission; and
determining the position of the second communication node at least partly based on a transmission time of the timing measurement message and a reception time of the acknowledgement message.

2. The method according to claim 1, further comprising selecting, based on the channel sounding feedback information received from the second communication node, a precoder for the beamformed transmission of the timing measurement message from a codebook of different precoders dedicated for use in beamformed transmissions of timing measurement messages.

3. A first communication node for determining the position of a second communication node in a wireless communications network, the first communication node being configured to transmit a timing measurement message to the second communication node as a beamformed transmission based on channel sounding feedback information received from the second communication node, receive an acknowledgement message from the second communication node for the timing measurement message in the beamformed transmission, and determine the position of the second communication node at least partly based on a transmission time of the timing measurement message and a reception time of the acknowledgement message.

4. The first communication node according to claim 3, further configured to select, based on the channel sounding feedback information received from the second communication node, a precoder for the beamformed transmission of the timing measurement message from a codebook of different precoders dedicated for use in beamformed transmissions of timing measurement messages.

5. The first communication node according to claim 4, further configured to select the precoder based on information indicating a precoder in the channel sounding feedback information received from the second communication node, or based on the channel sounding feedback information received from the second communication node such that the received energy in the second communication node is maximized.

6. The first communication node according to claim 3, further configured to, prior to transmitting the timing measurement message and in response to receiving a ranging request message from the second communication node, transmit an acknowledgement message for the ranging request message comprising channel sounding information to the second communication node, and receive channel sounding feedback information from the second communication node based on the channel sounding information in the transmitted acknowledgement message.

7. The first communication node according to claim 3, further configured to, prior to the transmission of the timing measurement message and in response to receiving a ranging request message from the second communication node, perform at least one Non-Data Packet, NDP, channel sounding message exchange with the second communication node.

8. The first communication node according to claim 7, further configured to perform the at least one NDP channel sounding message exchange with the second communication node for two or more precoders, transmit two or more timing measurement messages to the second communication node as beamformed transmissions based on each of the two or more precoders, and receive acknowledgement messages from the second communication node for the two or more transmitted timing measurement messages in the beamformed transmissions.

9. The first communication node according to claim 6, further configured to repeat transmissions of the acknowledgement message or NDP channel sounding message for at least a subset of all beamforming directions.

10. The first communication node according to claim 3, wherein the timing measurement message is a Fine Timing Measurement, FTM, frame or data packet.

11. A method performed by a second communication node for enabling positioning of the second communication node in a first communication node in a wireless communications network, the method comprising
receiving a timing measurement message from the first communication node as a beamformed transmission based on channel sounding feedback information transmitted to the first communication node; and
transmitting an acknowledgement message to the first communication node for the timing measurement message in the beamformed transmission.

12. The method according to claim 11, further comprising determining the position of the first communication node at least partly based on a reception time of the timing measurement message and a transmission time of the acknowledgement message.

13. The method according to claim 11, wherein the channel sounding feedback information transmitted to the first communication node comprise information indicating a precoder for a beamformed transmission of a timing measurement message from a codebook of different precoders dedicated for use in beamformed transmissions of timing measurement messages.

14. A second communication node for enabling positioning of the second communication node in a first communication node in a wireless communications network, the second communication node being configured to
receive a timing measurement message from the first communication node as a beamformed transmission based on channel sounding feedback information transmitted to the first communication node, and transmit an acknowledgement message to the first communication node for the timing measurement message in the beamformed transmission.

15. The second communication node according to claim 14, further configured to determine the position of the first communication node at least partly based on a reception time of the timing measurement message and a transmission time of the acknowledgement message.

16. The second communication node according to claim 14, wherein the channel sounding feedback information transmitted to the first communication node comprise information indicating a precoder for a beamformed transmission of a timing measurement message from a codebook of different precoders dedicated for use in beamformed transmissions of timing measurement messages.

17. The second communication node according to claim 14, further configured to, in response to transmitting a ranging request message from the second communication node, receive an acknowledgement message comprising channel sounding information from the first communication node, and transmit channel sounding feedback information to the first communication node based on the channel sounding information in the received acknowledgement message.

18. The second communication node according to claim 14, further configured to, in response to transmitting a ranging request message to the first communication node, perform at least one Non-Data Packet, NDP, channel sounding message exchange with the first communication node.

19. The second communication node according to claim 18, further configured to perform the at least one NDP channel sounding message exchange with the first communication node for two or more precoders, receive two or more timing measurement messages from the first communication node as beamformed transmissions based on each of the two or more precoders, and transmit acknowledgement messages to the first communication node for the two or more transmitted timing measurement messages in the beamformed transmissions.

20. The second communication node according to claim 14, wherein the timing measurement message is a Fine Timing Measurement, FTM, frame or data packet.

21. A computer program product, comprising instructions which, when executed on at least one processor, cause the at least one processor to carry out the method according to claim 1.

* * * * *